United States Patent Office 2,954,406
Patented Sept. 27, 1960

2,954,406

4-VINYLCYCLOHEXENE HYDROPEROXIDE

William F. Brill, Skillman, N.J., assignor to Petro-Tex Chemical Corporation, Houston, Tex., a corporation of Delaware No Drawing. Filed Feb. 20, 1959, Ser. No. 794,515

2 Claims. (Cl. 260—610)

This invention relates to alicyclic hydroperoxides and relates more particularly to 4-vinylcyclohexene hydroperoxide and to a process for making the same.

4-vinylcyclohexene hydroperoxide has the general formula

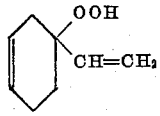

and is a stable water white liquid which has utility as a polymerization catalyst, as a curing agent for resins and unsaturated polymers such as rubber, and as a chemical intermediate. In the production of vinyl and vinylidene type polymers the 4-vinylcyclohexene hydroperoxide may function as both a polymerization initiator and/or as a comonomer. The 4-vinylcyclohexene hydroperoxide is valuable as an intermediate in the preparation of 1-vinyl-3-cyclohexenol and 2-cyclohexenone. The 1-vinyl-3-cyclohexenol is readily obtained by heat induced decomposition of 4-vinylcyclohexene hydroperoxide or by catalytic or sulfite reduction of 4-vinylcyclohexene hydroperoxide as is disclosed in my copending application, serial number 794,514, filed February 20, 1959. 2-cyclohexenone is obtained by the acid catalyzed decomposition of 4-vinylcyclohexene hydroperoxide as is disclosed in my compending application, Serial Number 794,493, filed February 20, 1959.

4-vinylcyclohexene hydroperoxide is a novel allylic compound possessing both vinyl and tertiary hydroperoxide functions. Quite unexpectedly, the 4-vinylcyclohexene hydroperoxide is obtained in good yield by reacting molecular oxygen with 4-vinylcyclohexene at moderate temperatures. The 4-vinylcyclohexene may act both as reactant and solvent. Oxidation catalysts appear to be unnecessary although they could be used, if desired. The 4-vinylcyclohexene hydroperoxide is readily isolated as by fractionation of the oxidized 4-vinylcyclohexene reaction mixture.

It is quite unexpected that 4-vinylcyclohexene hydroperoxide is so readily prepared by the uncatalyzed low temperature reaction of molecular oxygen with 4-vinylcyclohexene. There are three possible points of attack for oxidation of 4-vinylcyclohexene and the attack at the single tertiary carbon in the 4-vinylcyclohexene to form good yields of the 4-vinylcyclohexene hydroperoxide in the absence of catalysts is unexpected. Cumene hydroperoxide, which is a well known commercial product, for example, is not obtained in the absence of catalyst by passing molecular oxygen through cumene even at 90° C. over long periods of time, while 4-vinylcyclohexene hydroperoxide is readily prepared at 50° C. by passing oxygen through 4-vinylcyclohexene in the absence of catalysts.

4-vinylcyclohexene is readily and inexpensively obtained as by-product of butadiene production, or is prepared by dimerizing butadiene-1,3 by heating in the presence of a polymerization inhibitor such as hydroquinone.

In general, 4-vinylcyclohexene hydroperoxide is prepared by passing oxygen through 4-vinylcyclohexene, which may be dissolved in a solvent if desired. The oxidation of the 4-vinylcyclohexene begins immediately. The reaction is generally conducted at moderate temperatures, ordinarily at less than about 100° C. since long exposure of the hydroperoxide at high temperatures tends to cause decomposition and formation of 1-vinyl-3-cyclohexenol. More preferably, the temperature of reaction is between about 50° C. and 100° C. Oxidation catalysts may be used if desired and pressure reactions are contemplated. The amount of oxygen, flow rate and time of reaction may be suitably regulated by those skilled in the art to get most efficient conversion of the 4-vinylcyclohexene to the desired hydroperoxide. The following embodiments of the invention are representative in disclosing methods for preparing 4-vinylcyclohexene hydroperoxide.

Four moles of 4-vinylcyclohexene was placed in a reactor equipped with a gas inlet, a condenser, and heating and cooling means. The 4-vinylcyclohexene was heated to 50° C. with stirring. Oxygen was then passed into the 4-vinylcyclohexene at a rate sufficient to maintain an exit gas flow rate of approximately 18 milliliters per minute. The oxygen consumed was measured by wet test meters in the feed and exit lines. After the reaction was completed, the unreacted 4-vinylcyclohexene was removed and the product was distilled at reduced pressure. The 4-vinylcyclohexene hydroperoxide recovered was obtained at 64–66° C. at 0.5 mm., and was titrated for percent hydroperoxide by an iodimetric titration method found in Siggia, p. 148, "Quantitative Organic Analysis via Functional Groups," 2nd edition (1954). 69 percent hydroperoxide was found. Redistillation gave a sample titrating for 81 percent hydroperoxide, having a refractive index of $n_D^{25}$ 1.4951, a density of $D_4^{20}$ 1.0164 and molar refraction $M_D$ 40.9 (calculated 39.2).

Redistilled 4-vinylcyclohexene was oxidized as described above at 70° C. and at a rate of oxygen flow through the exit meter of 8 to 9 milliliters per minute. A plot of oxygen consumed against time indicates that the reaction rate gradually increases and becomes constant after 10 hours at 70° C., and 3 hours at 90° C. The maximum rate for these temperatures in terms of moles of oxygen absorbed per mole initial olefin sec were, $1.4 \times 10^{-5}$ at 70° C. and $3.4 \times 10^{-3}$ at 90° C. Elemental analysis of redistilled 4-vinylcyclohexene hydroperoxide of 76.8 percent purity gave carbon content of 70.09 percent and hydrogen 8.87 percent, calculated 70.2 percent carbon and 8.93 percent hydrogen. When this example was repeated at 90° C. with 11 moles of 4-vinylcyclohexene for 3 hours, a concentration of 4-vinylcyclohexene hydroperoxide of about 15 percent was reached in about 2½ hours. Reasonably good yield of 4-vinylcyclohexene hydroperoxide, titrating about 60 percent hydroperoxide, was obtained at the 90° C. reaction temperature for short periods of reaction, that is about 2 to 3 hours. Longer periods of reaction at this temperature result in decreased yield of 4-vinylcyclohexene hydroperoxide because of thermal decomposition. Heating 4-vinylcyclohexene hydroperoxide to about 100° C. converts it to 1-vinyl-3-cyclohexenol.

I claim:
1. 4-vinylcyclohexene hydroperoxide.
2. The method for making 4-vinylcyclohexene hydroperoxide which comprises contacting 4-vinylcyclohexene with molecular oxygen at a temperature in the range of about 50° C. to about 100° C. and recovering the resulting 4-vinylcyclohexene hydroperoxide.

References Cited in the file of this patent

UNITED STATES PATENTS 2,668,163   Reynolds et al. _____ Feb. 2, 1954
2,708,664   Jones _____ May 17, 1955